(12) United States Patent
Demott et al.

(10) Patent No.: US 12,122,465 B2
(45) Date of Patent: Oct. 22, 2024

(54) DECOUPLED FIFTH WHEEL AND GOOSENECK SUBFRAMES

(71) Applicant: Ford Global Technologies, LLC, Dearborn, MI (US)

(72) Inventors: Lucas Demott, Canton, MI (US); Cliff Standifer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 627 days.

(21) Appl. No.: 17/215,903

(22) Filed: Mar. 29, 2021

(65) Prior Publication Data

US 2022/0306217 A1 Sep. 29, 2022

(51) Int. Cl.
*B62D 53/08* (2006.01)
*B60D 1/06* (2006.01)

(52) U.S. Cl.
CPC ......... *B62D 53/0828* (2013.01); *B60D 1/065* (2013.01)

(58) Field of Classification Search
CPC ..... B62D 53/0828; B60D 1/065; B60D 1/488
See application file for complete search history.

(56) References Cited

U.S. PATENT DOCUMENTS

| | | | |
|---|---|---|---|
| 4,546,994 A * | 10/1985 | Taylor | B62D 53/0842 280/901 |
| 7,793,968 B1 | 9/2010 | Withers | |
| 10,766,322 B2 * | 9/2020 | McGory | B60D 1/485 |
| 2009/0085326 A1 * | 4/2009 | Linger | B62D 53/0828 280/433 |
| 2017/0305218 A1 * | 10/2017 | Stanifer | B60D 1/015 |
| 2018/0250994 A1 | 9/2018 | Garner et al. | |
| 2020/0070905 A1 | 3/2020 | Guthard et al. | |
| 2020/0361257 A1 * | 11/2020 | Helmeczi | B60D 1/247 |
| 2021/0178842 A1 * | 6/2021 | McCoy | B60D 1/488 |

FOREIGN PATENT DOCUMENTS

CA 2852125 A1 * 11/2014 ............... B60D 1/06

OTHER PUBLICATIONS

Redstone Manufacturing, Stamped Vs. Cast, Dec. 3, 2020, Metal Materials (Year: 2020).*

* cited by examiner

*Primary Examiner* — Jacob D Knutson
*Assistant Examiner* — Abigail R Hymel
(74) *Attorney, Agent, or Firm* — Lorne Forsythe; Hanley, Flight & Zimmerman, LLC (57) ABSTRACT

Decoupled fifth wheel and gooseneck subframes are disclosed. An example apparatus includes brackets couplable to a vehicle frame, the brackets including puck mounts to receive a fifth wheel hitch, a subframe couplable between the brackets, the subframe including an aperture, and a gooseneck mount to receive a gooseneck ball, the gooseneck mount to be disposed in the aperture and couplable to the subframe.

22 Claims, 8 Drawing Sheets

DECOUPLED FIFTH WHEEL AND GOOSENECK SUBFRAMES

FIELD OF THE DISCLOSURE

This disclosure relates generally to vehicles and, more particularly, to decoupled fifth wheel and gooseneck subframes.

BACKGROUND

A trailer is typically coupled to a vehicle using either a fifth wheel hitch or a gooseneck ball. In some cases, a subframe is couplable to a frame of the vehicle to provide at least one of a fifth wheel hitch mount for coupling the fifth wheel hitch thereto, or a gooseneck ball mount for coupling the gooseneck ball thereto.

SUMMARY

An example apparatus disclosed herein includes brackets couplable to a vehicle frame. The brackets include puck mounts to receive a fifth wheel hitch. A subframe is couplable between the brackets, the subframe including an aperture. A gooseneck mount is to receive a gooseneck ball, the gooseneck mount to be disposed in the aperture and couplable to the subframe.

An example apparatus disclosed herein includes inner and outer brackets. A rail of a vehicle frame is couplable between the inner and outer brackets. The inner brackets include openings to receive a fifth wheel hitch, and an H-frame is couplable between the inner brackets. The H-frame includes a circular aperture between front and rear plates of the H-frame.

An example method disclosed herein includes coupling brackets to a vehicle frame, the brackets including puck mounts to receive a fifth wheel hitch, coupling an H-frame between the brackets, the H-frame including an aperture, and coupling a gooseneck mount to the H-frame, the gooseneck mount disposed in the aperture, the gooseneck mount to receive a gooseneck ball.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Typically, a trailer is couplable to a vehicle (e.g., a truck) via a subframe bolted to a bed of the vehicle. The subframe can include mounts for a fifth wheel hitch, a mount for a gooseneck ball, or both. In some cases, the subframe is selected based on the type of the trailer to be towed. For example, fifth wheel hitches are commonly used when the trailer is a recreational vehicle (RV), while gooseneck balls are commonly used with livestock and cargo trailers.

In some known subframes, the fifth wheel hitch mounts and the gooseneck ball mount are both included in the subframe. However, a user of the subframe commonly utilizes only the fifth wheel hitch mounts or only the gooseneck ball mount. As such, some known subframes include parts that are not usable by the user, thus unnecessarily increasing weight and/or cost of the subframes.

Examples disclosed herein provide a decoupled fifth wheel and gooseneck subframe (e.g., a decoupled subframe) that can be configured for fifth wheel towing only, or for both fifth wheel and gooseneck towing. In examples disclosed herein, the example decoupled subframe includes example brackets with example puck mounts for mounting a fifth wheel hitch thereto. The brackets are couplable to an example vehicle frame. In some examples, an example H-frame can be coupled between the brackets to increase a payload to be supported by the fifth wheel hitch. Furthermore, an example gooseneck mount is couplable to the H-frame and disposed in an aperture of the H-frame. The gooseneck mount can receive a gooseneck ball for coupling a trailer thereto. In examples disclosed herein, a user of the decoupled subframe can implement only the brackets on the vehicle frame when towing a trailer using the fifth wheel hitch, thus reducing a number of parts required and reducing cost to the user. Optionally, the user can purchase and implement the H-frame and the gooseneck mount to enable towing of a trailer using a gooseneck ball. In examples disclosed herein, the brackets, the H-frame, and the gooseneck mount are couplable via bolts. Thus, a configuration of the decoupled subframe can be selectively modified by the user by adding and/or removing the H-frame or the gooseneck mount to and/or from the decoupled subframe.

Figure 1:
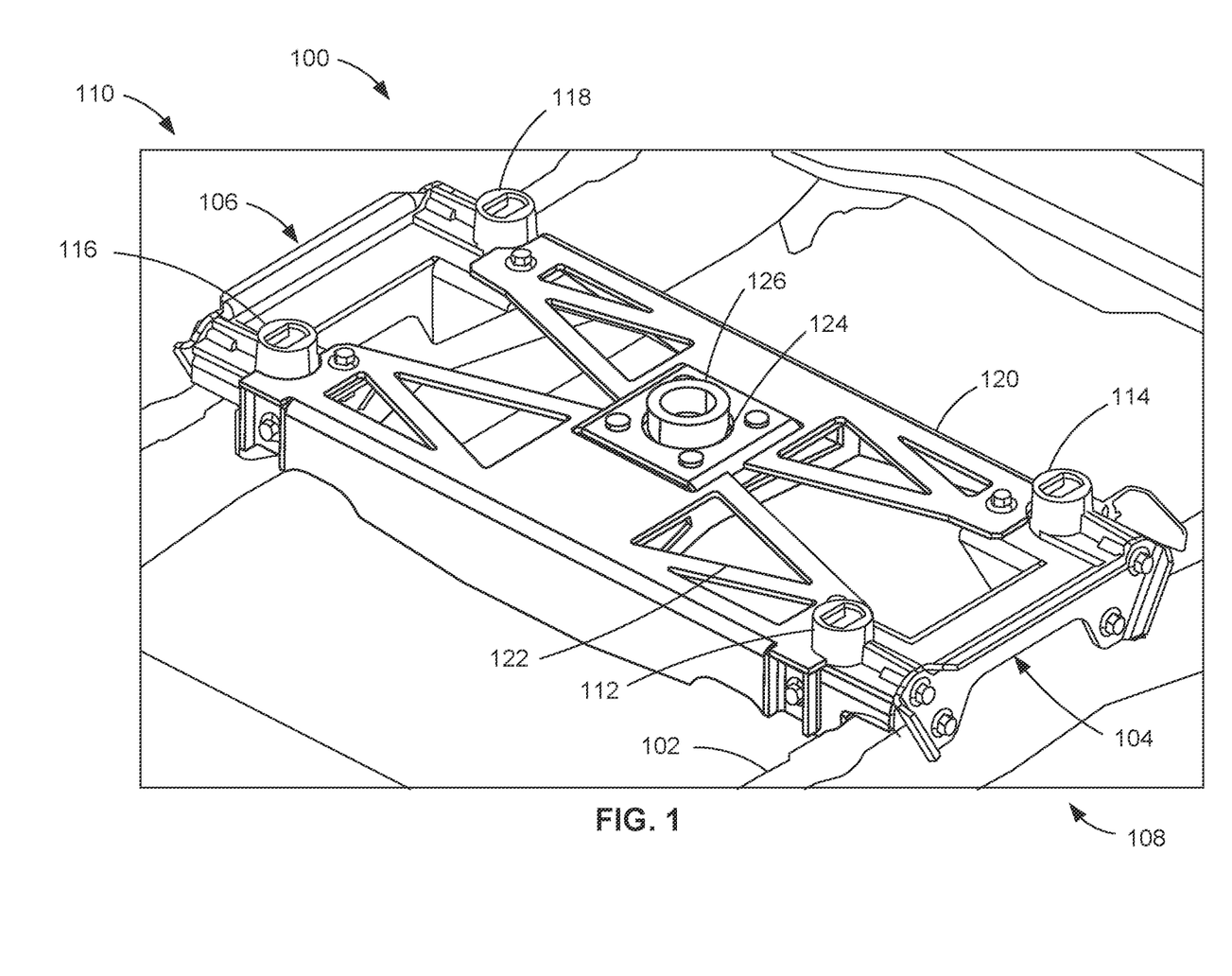
FIG. 1 illustrates an example decoupled fifth wheel and gooseneck subframe in accordance with teachings of this disclosure.

FIG. 1 illustrates an example decoupled subframe (e.g., a decoupled fifth wheel and gooseneck subframe) 100 in accordance with teachings of this disclosure. In the illustrated example of FIG. 1, the decoupled subframe 100 is coupled to a vehicle frame 102 and is configured for both fifth wheel and gooseneck towing. In examples disclosed herein, the decoupled subframe 100 can be configured for fifth wheel towing, or for both fifth wheel and gooseneck towing.

The example decoupled subframe 100 includes example brackets 104, 106 coupled to respective left and right sides 108, 110 of the vehicle frame 102. The brackets 104, 106 include respective example puck mounts 112, 114, 116, 118. The puck mounts 112, 114, 116, 118 are openings in the respective brackets 104, 106 for receiving a fifth wheel hitch. For example, each of the puck mounts 112, 114, 116, 118 is couplable to a corresponding foot of the fifth wheel hitch. As such, the puck mounts 112, 114, 116, 118 enable the fifth wheel hitch and, thus, a trailer couplable to the fifth wheel hitch, to be fixed to the vehicle frame 102. In this example, the brackets 104, 106 are substantially the same, and the puck mounts 112, 114, 116, 118 are substantially the same.

In the illustrated example of FIG. 1, an example H-frame (e.g., a subframe) 120 is coupled between the brackets 104, 106. In this example, the H-frame 120 includes example cutouts 122 to form a truss-like pattern. While the cutouts 122 are triangular in this example, a different number, location, shape, and/or size of the cutouts 122 may be used. The H-frame 120 further includes an example aperture (e.g., a circular aperture) 124. In this example, the aperture 124 is circular. In the illustrated example of FIG. 1, an example gooseneck mount 126 is disposed in the aperture 124 and coupled to the H-frame 120. The gooseneck mount 126 receives a gooseneck ball for coupling a trailer thereto. In this example, the gooseneck mount 126 can be coupled to the H-frame 120 without removing a bed of the vehicle.

Figure 2:
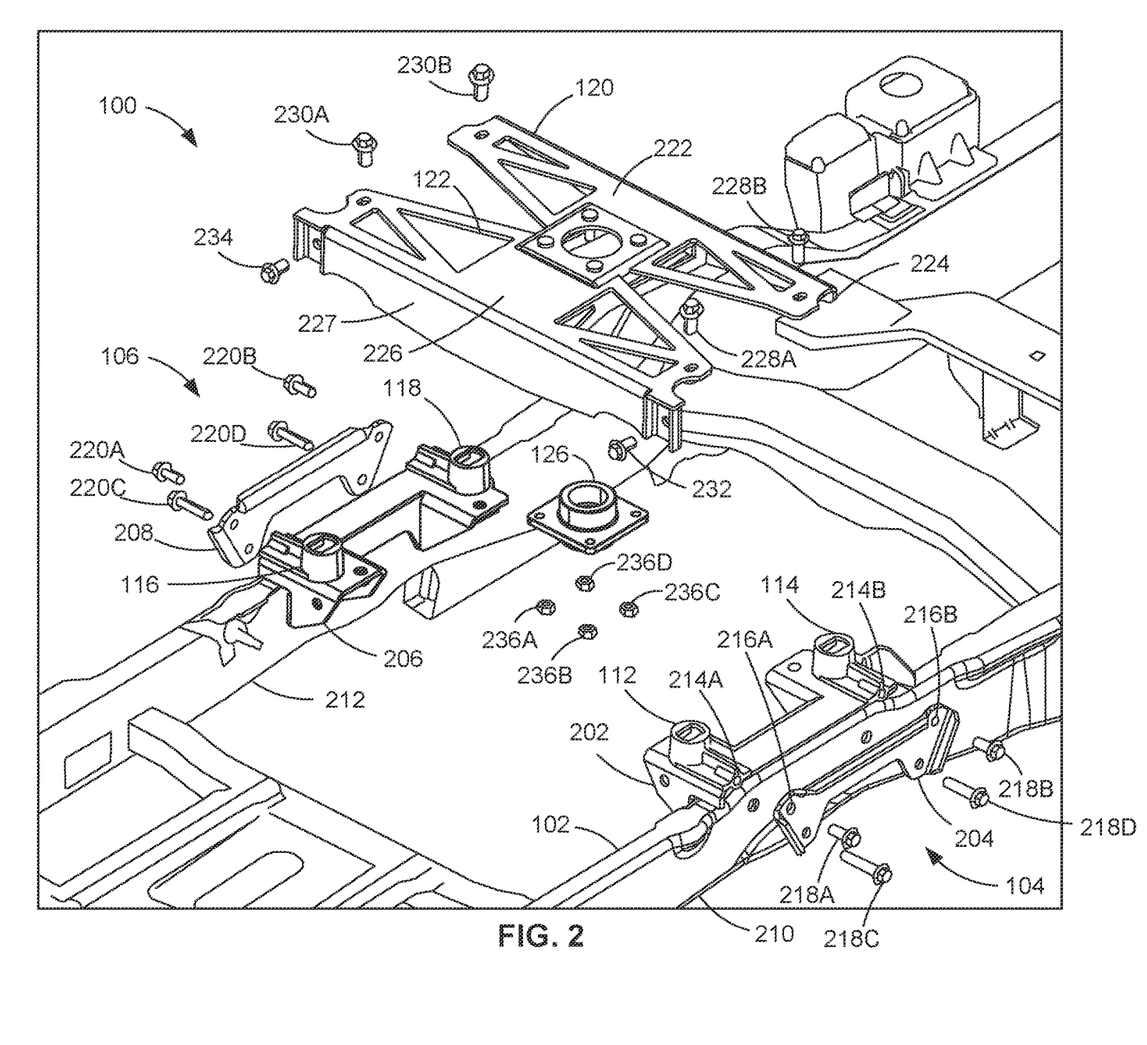
FIG. 2 is an exploded view of the example decoupled fifth wheel and gooseneck subframe of FIG. 1.

FIG. 2 is exploded view of the example decoupled subframe 100 of FIG. 1. In the illustrated example of FIG. 2, the first bracket 104 includes an example first inner bracket 202 and an example first outer bracket 204, and the second bracket 106 includes an example second inner bracket 206 and an example second outer bracket 208. The first inner bracket 202 includes the first and second puck mounts 112, 114 coupled (e.g., welded) thereto, and the second inner bracket 206 includes the third and fourth puck mounts 116, 118 coupled (e.g., welded) thereto. In this example, the inner brackets 202, 206 and the outer brackets 204, 208 are stamped steel, and the puck mounts 112, 114, 116, 118 are cast steel. In examples disclosed herein, the inner brackets 202, 206 are substantially the same, and the outer brackets 204, 208 are substantially the same.

In this example, the first inner bracket 202 and the first outer bracket 204 form a first channel to receive an example first rail 210 of the vehicle frame 102, and the second inner bracket 206 and the second outer bracket 208 form a second channel to receive an example second rail 212 of the vehicle frame 102. In this example, the first rail 210 is bolted between the first inner and outer brackets 202, 204, and the second rail 212 is bolted between the second inner and outer brackets 206, 208. For example, the first inner bracket 202 includes example first openings 214A, 214B, and the first outer bracket 204 includes example second openings 216A, 216B. In some examples, the first openings 214A, 214B are substantially aligned with the second openings 216A, 216B. In such examples, first bolts 218A, 218B are disposed in the first and second openings 214A, 214B, 216A, 216B to fasten the first inner bracket 202 to the first outer bracket 204, and example second bolts 220A, 220B fasten the second inner bracket 206 to the second outer bracket 208. In some examples, one or more additional bolts 218C, 218D, 220C, 220D may be used to fasten the outer brackets 204, 208, the inner brackets 202, 206, and the respective rails 210, 212 via one or more existing openings.

In the illustrated example of FIG. 2, the H-frame 120 further includes an example front plate 222 with an example front flanged section 224, and an example rear plate 226 with an example rear flanged section 227. In this example, the front plate 222 and the rear plate 226 include the example cutouts 122. In this example, the H-frame 120 is fastened to the inner brackets 202, 206 at the front and rear plates 222, 226. For example, example third bolts 228A, 228B are used to fasten the front and rear plates 222, 226 to a top of the first inner bracket 202, and example fourth bolts 230A, 230B are used to fasten the front and rear plates 222, 226 to a top of the second inner bracket 206. In this example, an example fifth bolt 232 is used to fasten the rear flanged section 227 to a side of the first inner bracket 202, and an example sixth bolt 234 is used to fasten the rear flanged section 227 to a side of the second inner bracket 206. In some examples, one or more additional bolts can be used to fasten the front flanged section 224 to sides of the first and second inner brackets 202, 206. Although bolts are used in this example, one or more different fasteners may additionally or alternatively be used. In this example, example nuts 236A-D are used to couple the gooseneck mount 126 to the H-frame 120.

Figure 3:
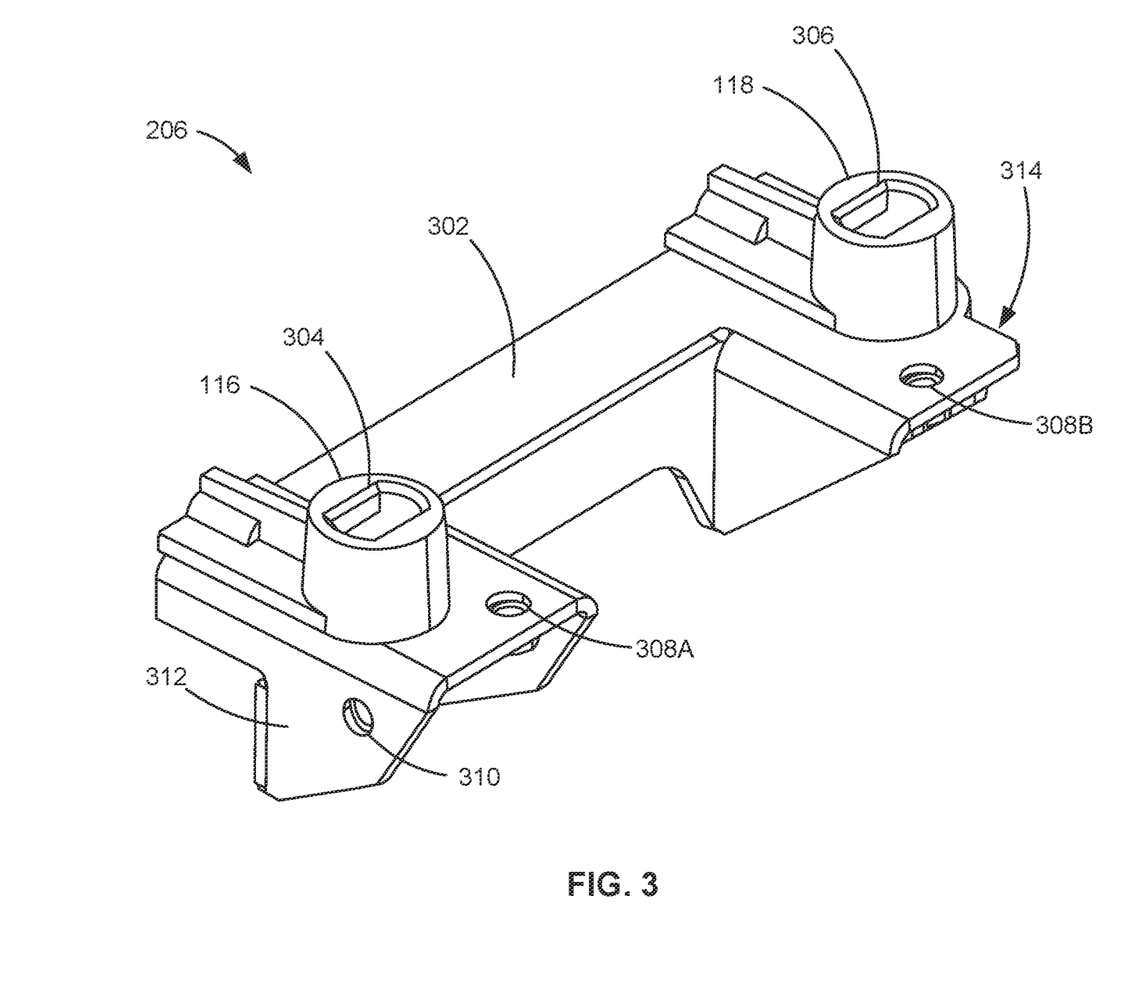
FIG. 3 illustrates an example inner bracket of the example decoupled fifth wheel and gooseneck subframe of FIG. 2.

FIG. 3 illustrates the example second inner bracket 206 of the decoupled subframe 100 of FIG. 2. In examples disclosed herein, the second inner bracket 206 is substantially the same as the first inner bracket 202. In the illustrated example of FIG. 3, the second inner bracket 206 includes the puck mounts 116, 118 welded to an example top surface 302 of the second inner bracket 206. The puck mounts 116, 118 include respective example openings 304, 306 to receive a fifth wheel hitch. For example, the openings 304, 306 can receive corresponding feet of the fifth wheel hitch. In this example, the openings 304, 306 are rectangular with at least two rounded sides. In other examples, the openings 304, 306 can have a different shape. In this example, the puck mounts 116, 118 prevent motion (e.g., rotation and/or translation) of the feet of the fifth wheel hitch relative to the second inner bracket 206. In some examples, the feet can be fastened (e.g., via one or more T-bolts) to the puck mounts 116, 118 to prevent removal of the feet from the openings 304, 306 when a trailer is coupled to the fifth wheel hitch. In particular, the puck mounts 116, 118 prevent detachment of the fifth wheel hitch from the decoupled subframe 100 during towing of the trailer.

In the illustrated example of FIG. 3, the second inner bracket 206 includes example top openings 308A, 308B in the top surface 302. The top openings 308A, 308B can receive the respective fourth bolts 230A, 230B of FIG. 2 to fasten the front and rear plates 222, 226 of the H-frame 120 of FIG. 2 to the second inner bracket 206. In this example, the second inner bracket 206 includes an example rear side opening 310 in an example rear surface 312 of the second inner bracket 206. The example rear side opening 310 can receive the sixth bolt 234 of FIG. 2 to fasten the rear plate 226 of the H-frame 120 of FIG. 2 to the rear surface 312 of the second inner bracket 206. In some examples, the second inner bracket 206 includes one or more additional openings in the top surface 302, the rear surface 312, and/or an example front surface 314 for receiving one or more additional bolts to fasten the H-frame 120 to the second inner bracket 206.

Figure 4:
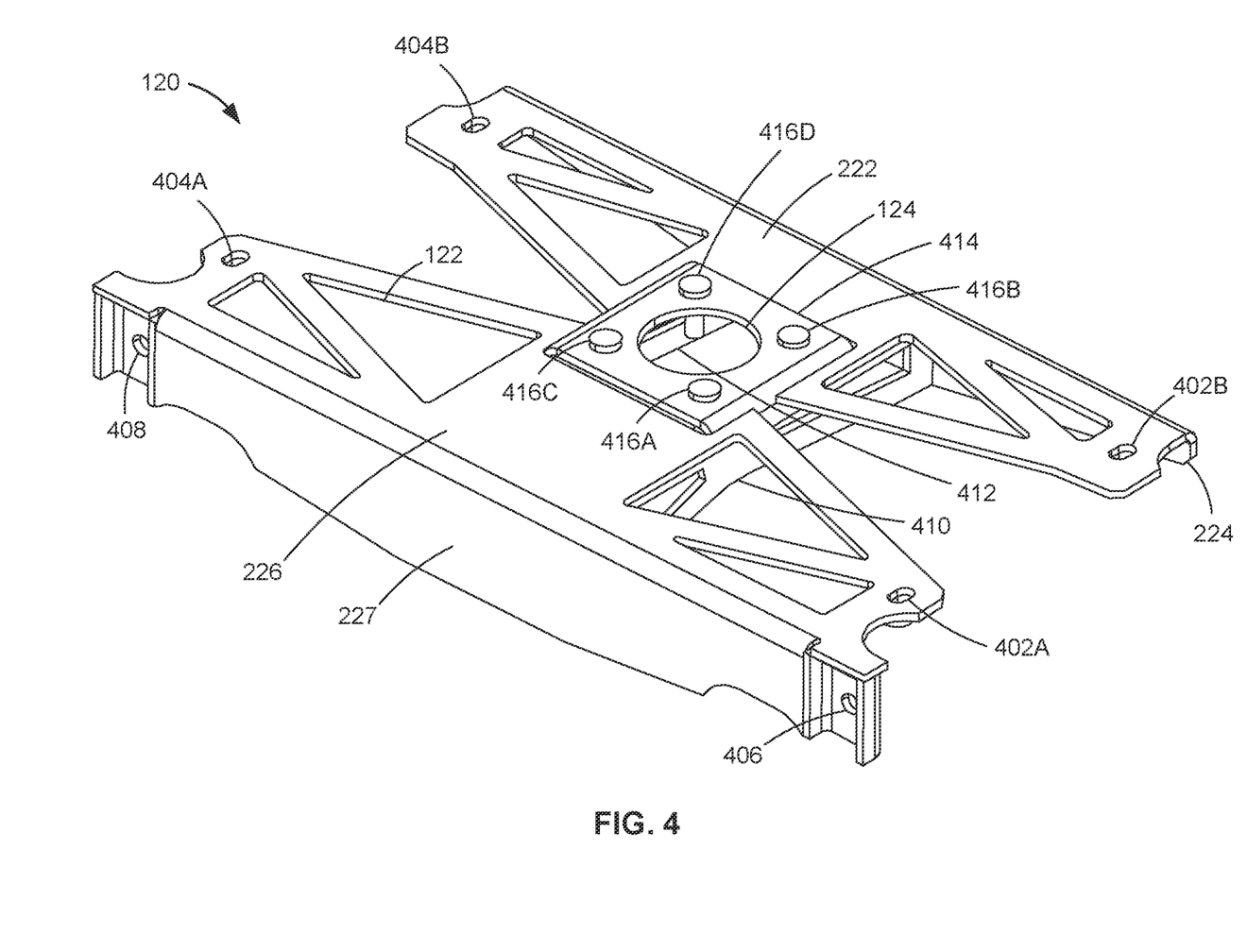
FIG. 4 illustrates an example H-frame of the example decoupled fifth wheel and gooseneck subframe of FIG. 2.

FIG. 4 illustrates the example H-frame 120 of the decoupled subframe 100 of FIG. 2. In this example, the H-frame 120 is stamped steel. In other examples, the H-frame 120 can be a different material. In the illustrated example, the cutouts 122 form a truss-like pattern in the front and rear plates 222, 226. While the cutouts 122 are triangular in this example, a different shape of the cutouts 122 may be used.

In this example, the H-frame 120 further includes example first openings 402A, 402B and example second openings 404A, 404B proximate left and right ends of the H-frame 120, respectively. In this example, the first openings 402A, 402B can receive the third bolts 228A, 228B of FIG. 2 to fasten the front and rear plates 222, 226 to the first inner bracket 202 of FIG. 2. Similarly, the second openings 404A, 404B can receive the fourth bolts 230A, 230B of FIG. 2 to fasten the front and rear plates 222, 226 to the second inner bracket 202 of FIGS. 2 and/or 3. In this example, an example opening 406 can receive the fifth bolt 232 of FIG. 2 to fasten the rear flanged section 227 to the first inner bracket 202, and an example opening 408 can receive the sixth bolt 234 of FIG. 2 to fasten the rear flanged section 227 to the second inner bracket 206. In some examples, the H-frame 120 further includes one or more additional openings in the front plate 222 and/or the rear plate 226 for receiving one or more additional bolts to fasten the H-frame 120 to the first and second inner brackets 202, 206.

In the illustrated example of FIG. 4, the H-frame 120 further includes example support rails (e.g., center rails) 410, 412 adjacent a bottom surface of the H-frame 120. In this example, the support rails 410, 412 are coupled between and welded to the front and rear flanged sections 224, 227 and welded to a bottom surface of the front and rear plates 222, 226. In some examples, the support rails 410, 412 provide structural support to the H-frame 120.

In this example, the aperture 124 is formed in an example mounting plate 414 coupled (e.g., welded) between the front and rear plates 222, 226. In this example, example weld studs 416A-D are disposed around the aperture 124 and welded to the mounting plate 414. In some examples, the gooseneck mount 126 of FIG. 2 can be disposed in the aperture 124 and coupled to the mounting plate 414 via the weld studs 416A-D and the corresponding nuts 236A-D of FIG. 2.

Figure 5A:
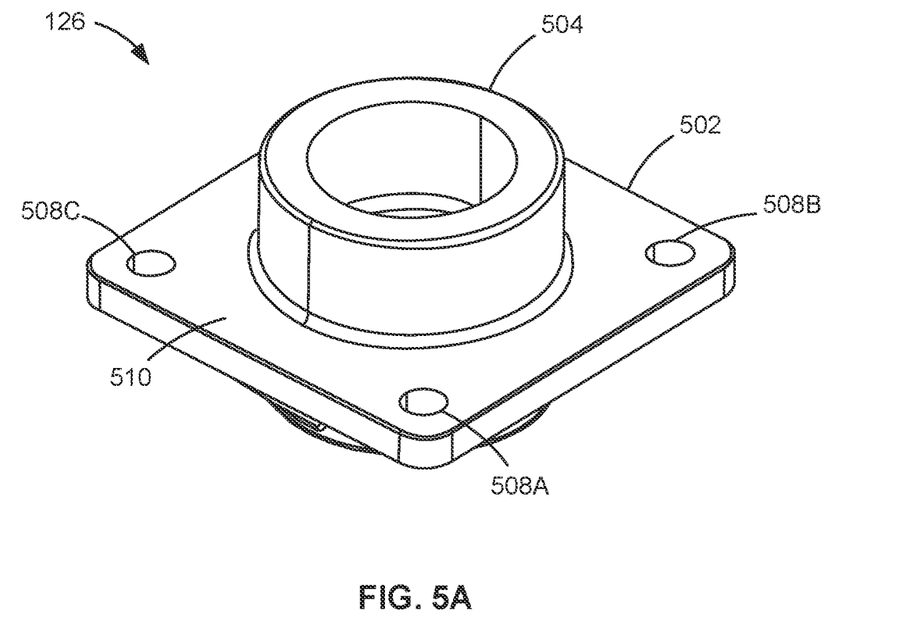
FIG. 5A is an isometric top view of an example gooseneck mount of the example decoupled fifth wheel and gooseneck subframe of FIG. 2.
Figure 5B:
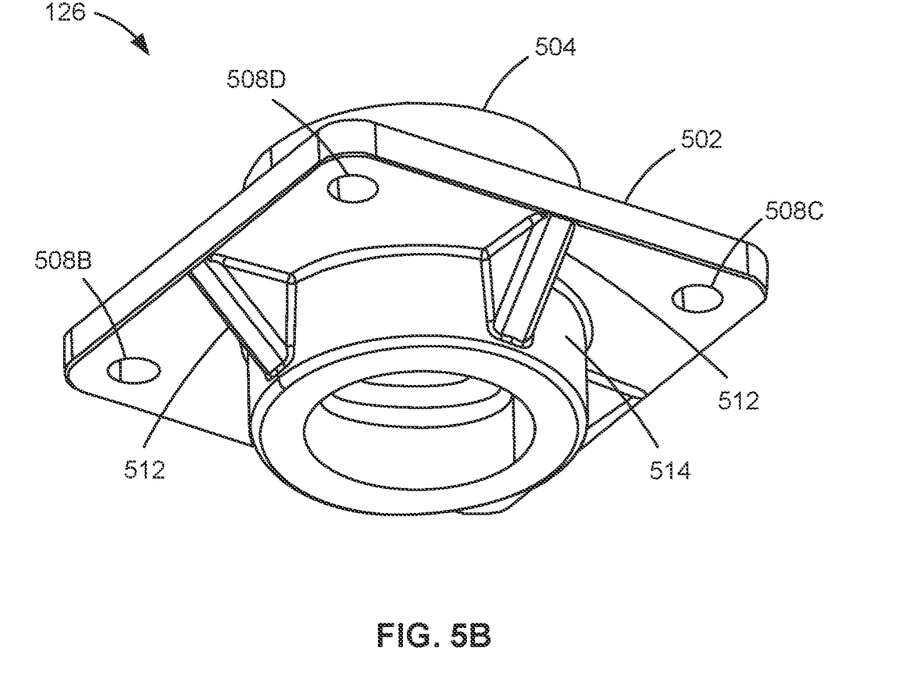
FIG. 5B is an isometric bottom view of the example gooseneck mount of FIG. 5A.

FIGS. 5A and 5B illustrate an isometric top view and an isometric bottom view, respectively, of the example gooseneck mount 126 of the example decoupled subframe 100 of FIG. 2. In this example, the gooseneck mount 126 is cast iron. In other examples, the gooseneck mount 126 can be a different material. In FIGS. 5A and 5B, the gooseneck mount 126 includes an example base plate 502 and an example cylindrical tube 504 extending therethrough. In these examples, the base plate 502 is square with rounded corners. In other examples, the shape of the base plate 502 can be different.

In these examples, an outer diameter of the cylindrical tube 504 corresponds to a diameter of the aperture 124 of FIG. 4. In other examples, the outer diameter of the cylindrical tube 504 is less than the diameter of the aperture 124. In some examples, the cylindrical tube 504 is disposed in the aperture 124 and receives a gooseneck ball for coupling a trailer thereto.

In the illustrated examples of FIGS. 5A and 5B, the base plate 502 includes example base plate openings 508A-D. The base plate openings 508A-D are disposed proximate respective corners of the base plate 502. In some examples, the base plate 502 can be coupled to the mounting plate 414 of FIG. 4, where a top surface 510 of the base plate 502 is adjacent a bottom surface of the mounting plate 414. In such examples, the base plate openings 508A-D are substantially aligned with corresponding openings of the mounting plate 414, and the weld studs 416A-D of FIG. 4 are disposed in the base plate openings 508A-D to fasten the base plate 502 to the mounting plate 414. In some examples, four of the weld studs 416A-D and corresponding four of the base plate openings 508A-D are used. In other examples, a different number of the weld studs 416A-D and/or the base plate openings 508A-D may be used.

In the illustrated example of FIG. 5B, the gooseneck mount 126 further includes example support brackets (e.g., gussets) 512 between the base plate 502 and an example outer surface 514 of the cylindrical tube 504. In some examples, four of the support brackets 512 are evenly spaced around the outer surface 514. In other examples, a different number of the support brackets 512 may be used.

Figure 6:
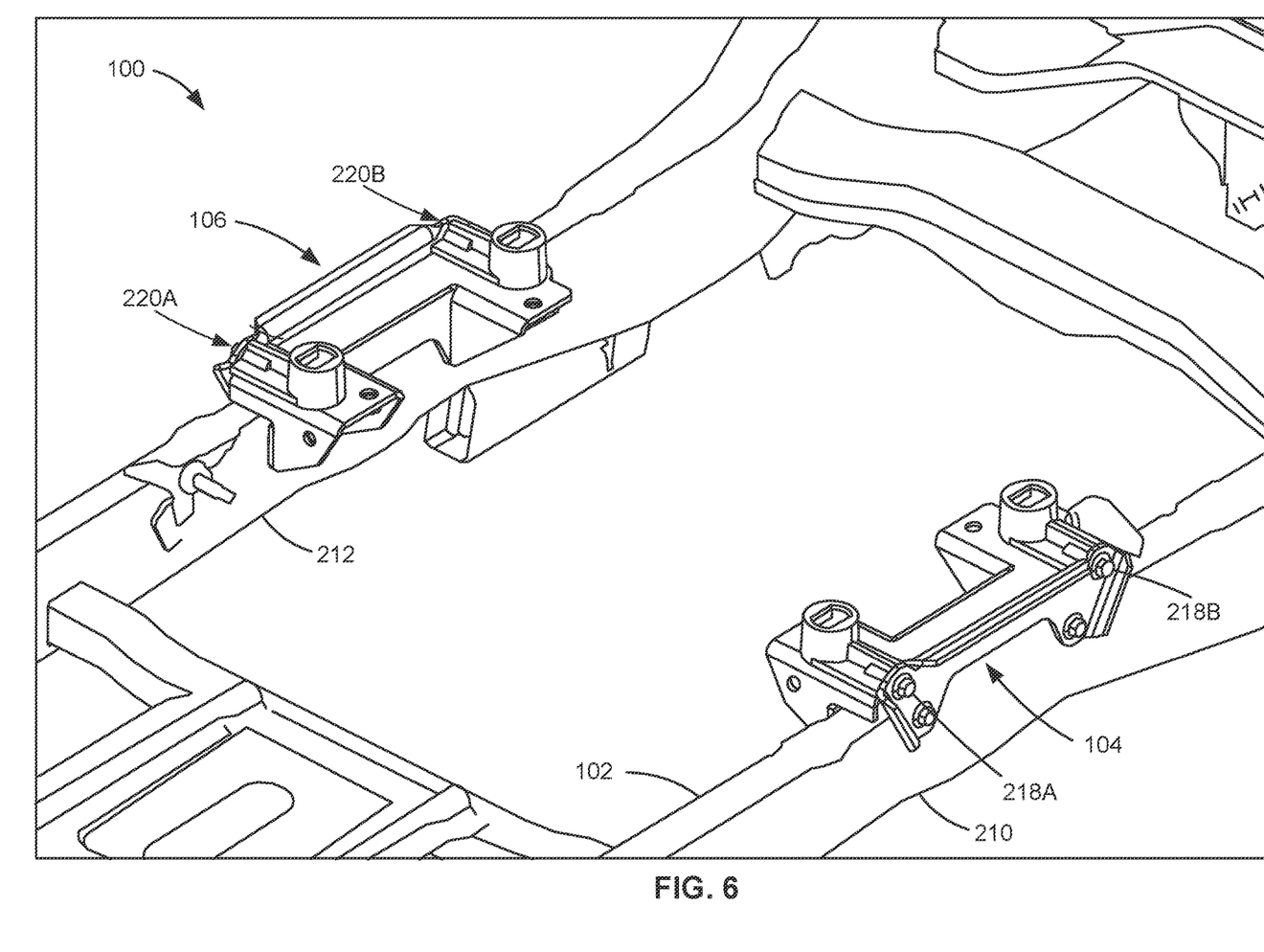
FIG. 6 illustrates the example brackets implemented on the example vehicle frame of FIG. 2.

FIG. 6 illustrates the example brackets 104, 106 implemented on the example vehicle frame 102 of FIG. 2. For example, the brackets 104, 106 are coupled to the respective first and second rails of the vehicle frame 102 using the first bolts 218A, 218B and the second bolts 220A, 220B. In this example, the decoupled subframe 100 is configured for coupling a fifth wheel hitch thereto. Furthermore, in this example, the decoupled subframe 100 does not include the H-frame 120 of FIG. 4. As such, the decoupled subframe 100 of FIG. 6 has a reduced weight compared to the decoupled subframe 100 including the H-frame 120.

Figure 7:
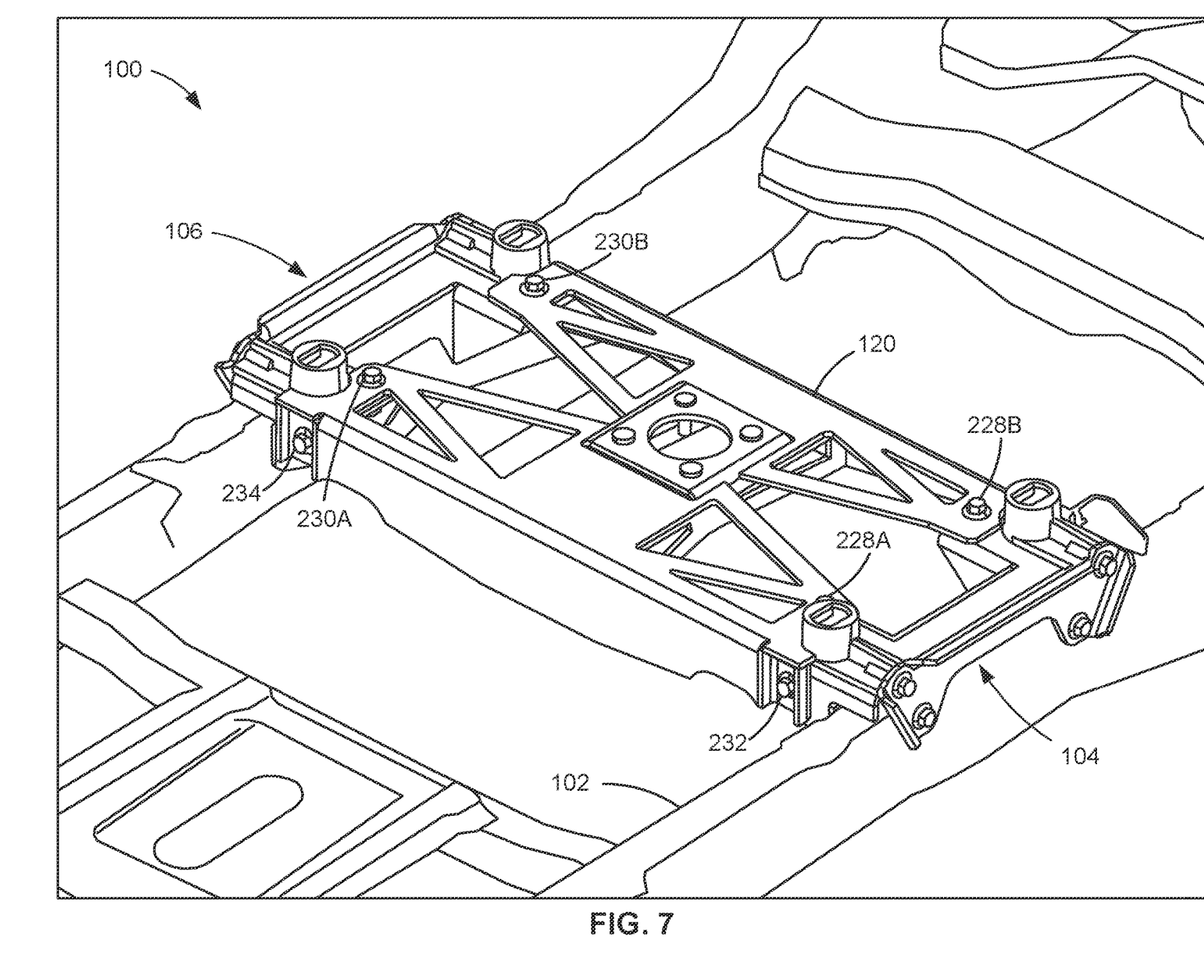
FIG. 7 illustrates the example H-frame of FIG. 4 implemented on the example brackets and the example vehicle frame of FIG. 6.

FIG. 7 illustrates the example H-frame 120 of FIG. 4 implemented on the example brackets 104, 106 and the example vehicle frame 102 of FIG. 6. For example, the H-frame 120 is fastened to the brackets 104, 106 using the third bolts 228A, 228B, the fourth bolts 230A, 230B, the fifth bolt 232, and the sixth bolt 234 of FIG. 2. Similar to the illustrated example of FIG. 6, the decoupled subframe 100 of FIG. 7 is configured for coupling a fifth wheel hitch thereto. In some examples, the decoupled subframe 100 of FIG. 7, by implementing the H-frame 120, has an increased weight compared to the decoupled subframe 100 of FIG. 6 not including the H-frame 120. In some examples, implementation of the H-frame 120 increases rigidity of the decoupled subframe 100 and, thus, may increase a towing capacity of the decoupled subframe 100.

In some examples, as shown in the illustrated example of FIG. 1, the gooseneck mount 126 can additionally be implemented on the H-frame 120. For example, the gooseneck mount 126 is fastened to the mounting plate 414 of FIG. 4 using the weld studs 416A-D of FIG. 4 and the corresponding nuts 236A-D of FIG. 2. In the illustrated example of FIG. 1, the decoupled subframe 100 enables coupling of both a fifth wheel hitch and a gooseneck ball to the decoupled subframe 100. In examples disclosed herein, the decoupled subframe 100 can be implemented with the brackets 104, 106 alone, with the brackets 104, 106 and the H-frame 120 alone, or with the brackets 104, 106, the H-frame 120, and the gooseneck mount 126. Advantageously, a user of the decoupled subframe 100 can selectively configure the decoupled subframe 100 based on a type, size, and/or weight of a trailer to be towed.

Figure 8:
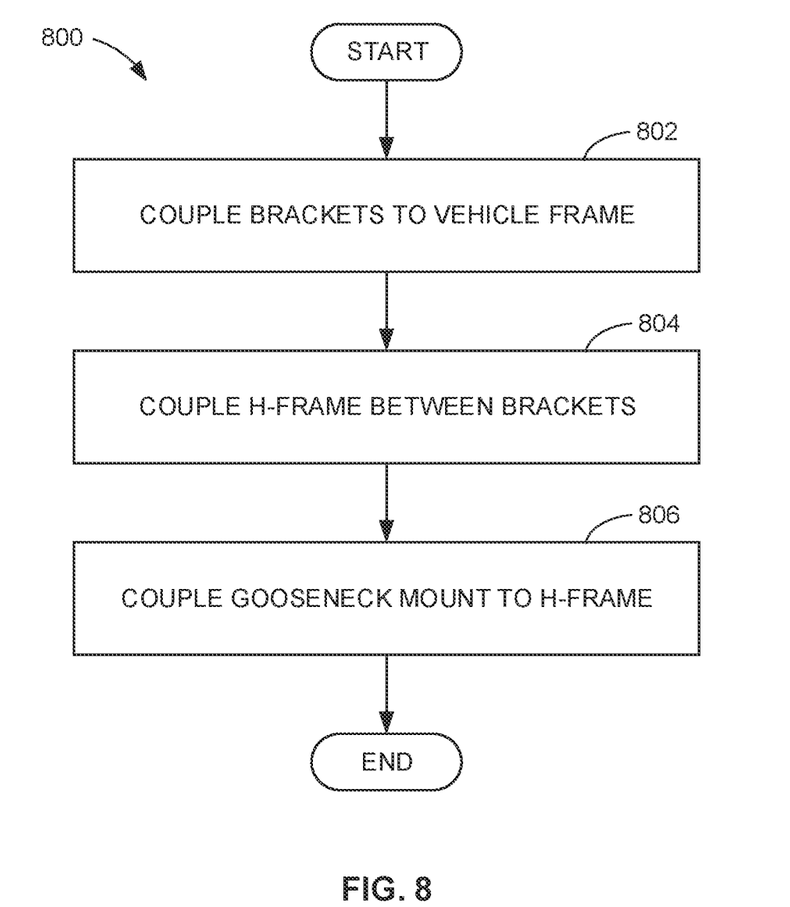
FIG. 8 is a flowchart representative of an example method to produce examples disclosed herein.

FIG. 8 is a flowchart representative of an example method 800 to produce examples disclosed herein. For example, the example method 800 can be executed to produce the decoupled subframe 100 implemented on the vehicle frame 102 of FIG. 1. The example method 800 of FIG. 8 begins at block 802, at which the brackets 104, 106 of FIG. 1 are coupled to the vehicle frame 102. For example, the first bracket 104 is coupled to the first rail 210 of the vehicle frame 102 via the first bolts 218A, 218B of FIG. 2, and the second bracket 106 is coupled to the vehicle frame 102 via the second bolts 220A, 220B of FIG. 2.

At block 804, the H-frame 120 of FIG. 1 is coupled between the brackets 104, 106. For example, the front and rear plates 222, 226 of the H-frame 120 are coupled to the brackets 104, 106 via the third and fourth bolts 228A, 228B, 230A, 230B of FIG. 2, and the rear plate 226 is coupled to the brackets 104, 106 via the fifth and sixth bolts 232, 234.

At block 806, the gooseneck mount 126 of FIG. 1 is coupled to the H-frame 120. For example, the gooseneck mount 126 is disposed in the aperture 124 of the mounting plate 414 and coupled to the mounting plate 414 via the weld studs 416A-D of FIG. 4 and the corresponding nuts 236A-D of FIG. 2.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide decoupled subframes for coupling a fifth wheel hitch and/or a gooseneck ball thereto. The disclosed methods, apparatus and articles of manufacture enable the decoupled subframes to be selectively configured based on a type of trailer to be towed. As such, the disclosed methods, apparatus and articles of manufacture reduce a number of parts required, and thus reduce weight, of the decoupled subframe when configured for fifth wheel towing compared to both fifth wheel and gooseneck towing.

Example 1 includes an apparatus including brackets couplable to a vehicle frame, the brackets including puck mounts to receive a fifth wheel hitch, a subframe couplable between the brackets, the subframe including an aperture, and a gooseneck mount to receive a gooseneck ball, the gooseneck mount to be disposed in the aperture and couplable to the subframe.

Example 2 includes the apparatus of Example 1, where front and rear plates of the subframe include cutouts to form a truss-like pattern.

Example 3 includes the apparatus of Example 2, where the gooseneck mount includes a base plate and a cylindrical tube extending therethrough, the base plate couplable via weld studs and nuts to a mounting plate of the subframe.

Example 4 includes the apparatus of Example 3, where the gooseneck mount includes support brackets between the base plate and an outer surface of the cylindrical tube.

Example 5 includes the apparatus of Example 1, where each of the brackets includes an inner bracket and an outer bracket to form a channel to receive a respective rail of the vehicle frame, the subframe to be fastened to the inner brackets.

Example 6 includes the apparatus of Example 5, where the inner brackets and the outer brackets are stamped steel, the puck mounts are cast steel, the puck mounts welded to the inner brackets.

Example 7 includes the apparatus of Example 1, where the subframe further includes a center rail coupled between front and rear flanged sections of the subframe and adjacent a bottom surface of the subframe.

Example 8 includes the apparatus of Example 1, where the gooseneck mount is cast iron and the subframe is stamped steel.

Example 9 includes an apparatus including inner and outer brackets, a rail of a vehicle frame couplable between the inner and outer brackets, the inner brackets including openings to receive a fifth wheel hitch, and an H-frame couplable between the inner brackets, the H-frame including a circular aperture between front and rear plates of the H-frame.

Example 10 includes the apparatus of Example 9, where the circular aperture is to receive a gooseneck mount, a base plate of the gooseneck mount couplable to a mounting plate of the H-frame.

Example 11 includes the apparatus of Example 10, where the gooseneck mount further includes a cylindrical tube extending through the base plate and support brackets between the base plate and an outer surface of the cylindrical tube.

Example 12 includes the apparatus of Example 10, where the gooseneck mount is cast iron and the H-frame is stamped steel.

Example 13 includes the apparatus of Example 9, where the H-frame is bolted to the inner brackets at top and side surfaces of the inner brackets.

Example 14 includes the apparatus of Example 13, where the H-frame further includes a support rail coupled between the front and rear flanged sections and adjacent a bottom surface of the H-frame.

Example 15 includes the apparatus of Example 9, where the openings of the inner brackets are rectangular with at least two rounded sides.

Example 16 includes a method including coupling brackets to a vehicle frame, the brackets including puck mounts to receive a fifth wheel hitch, coupling an H-frame between the brackets, the H-frame including an aperture, and coupling a gooseneck mount to the H-frame, the gooseneck mount disposed in the aperture, the gooseneck mount to receive a gooseneck ball.

Example 17 includes the method of Example 16, where front and rear plates of the H-frame include cutouts to form a truss-like pattern.

Example 18 includes the method of Example 16, and further includes fastening the H-frame to the brackets at top and side surfaces of the brackets.

Example 19 includes the method of Example 16, where the gooseneck mount includes a base plate and a cylindrical tube extending therethrough, further including coupling the base plate via weld studs and nuts to a mounting plate of the H-frame.

Example 20 includes the method of Example 19, further including coupling support brackets between the base plate and an outer surface of the cylindrical tube.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a first bracket couplable to a first side of a vehicle frame and a second bracket couplable to a second side of the vehicle frame, the first and second brackets including puck mounts to receive a fifth wheel hitch, the first bracket to extend a first distance from the first side toward the second side, the second bracket to extend a second distance from the second side toward the first side, a sum of the first and second distances less than a third distance between the first side and the second side;
a subframe couplable between the first and second brackets, the subframe including an aperture between a front plate and a rear plate of the subframe, the front plate including a cutout extending a fourth distance less than a fifth distance between the aperture and the first bracket, a width of the cutout to increase along the fourth distance from the first bracket to the aperture; and
a gooseneck mount to receive a gooseneck ball, the gooseneck mount to be disposed in the aperture and couplable to the subframe.

2. The apparatus of claim 1, wherein the cutout is to form a truss-like pattern.

3. The apparatus of claim 2, wherein the gooseneck mount includes a base plate and a cylindrical tube extending therethrough, the base plate couplable via weld studs and nuts to a mounting plate of the subframe.

4. The apparatus of claim 3, wherein the gooseneck mount includes support brackets between the base plate and an outer surface of the cylindrical tube.

5. The apparatus of claim 1, wherein each of the first and second brackets includes an inner bracket and an outer bracket to form a channel to receive a respective rail of the vehicle frame, the subframe to be fastened to the inner brackets.

6. The apparatus of claim 5, wherein the inner brackets and the outer brackets are stamped steel, the puck mounts are cast steel, the puck mounts welded to the inner brackets.

7. The apparatus of claim 1, wherein the subframe further includes a center rail coupled between front and rear flanged sections of the subframe and adjacent a bottom surface of the subframe.

8. The apparatus of claim 1, wherein the gooseneck mount is cast iron and the subframe is stamped steel.

9. The apparatus of claim 1, wherein the cutout is triangular.

10. The apparatus of claim 1, wherein the cutout is a first cutout, the rear plate including one or more second cutouts, a first shape of the first cutout corresponding to a second shape of the one or more second cutouts.

11. An apparatus comprising:
a first inner bracket and a first outer bracket, a first rail on a first side of a vehicle frame couplable between the first inner and outer brackets;
a second inner bracket and a second outer bracket, a second rail on a second side of the vehicle frame couplable between the second inner and outer brackets, the first and second inner brackets including openings to receive a fifth wheel hitch, the first inner bracket to extend a first distance from the first side toward the second side, the second inner bracket to extend a second distance from the second side toward the first side, a sum of the first and second distances less than a third distance between the first side and the second side; and
an H-frame couplable between the first and second inner brackets, the H-frame including a circular aperture between front and rear plates of the H-frame, the front plate including a cutout extending a fourth distance less than a fifth distance between the circular aperture and the first inner bracket, a width of the cutout to increase along the fourth distance from the first inner bracket to the circular aperture.

12. The apparatus of claim 11, wherein the circular aperture is to receive a gooseneck mount, a base plate of the gooseneck mount couplable to a mounting plate of the H-frame.

13. The apparatus of claim 12, wherein the gooseneck mount further includes a cylindrical tube extending through the base plate and support brackets between the base plate and an outer surface of the cylindrical tube.

14. The apparatus of claim 12, wherein the gooseneck mount is cast iron and the H-frame is stamped steel.

15. The apparatus of claim 11, wherein the H-frame is bolted to the first and second inner brackets at top and side surfaces of the first and second inner brackets.

16. The apparatus of claim 15, wherein the H-frame further includes a support rail coupled between front and rear flanged sections and adjacent a bottom surface of the H-frame.

17. The apparatus of claim 11, wherein the openings of the first and second inner brackets are rectangular with at least two rounded sides.

18. A method comprising:
coupling a first bracket to a first side of a vehicle frame and a second bracket to a second side of the vehicle frame, the first and second brackets including puck mounts to receive a fifth wheel hitch, the first bracket to extend a first distance from the first side toward the second side, the second bracket to extend a second distance from the second side toward the first side, a sum of the first and second distances less than a third distance between the first side and the second side;
coupling an H-frame between the first and second brackets, the H-frame including an aperture between front and rear plates of the H-frame, the front plate including a cutout extending a fourth distance less than a fifth distance between the aperture and the first bracket, a width of the cutout to increase along the fourth distance from the first bracket to the aperture; and
coupling a gooseneck mount to the H-frame, the gooseneck mount disposed in the aperture, the gooseneck mount to receive a gooseneck ball.

19. The method of claim 18, wherein the cutout is to form a truss-like pattern.

20. The method of claim 18, further including fastening the H-frame to the first and second brackets at top and side surfaces of the first and second brackets.

21. The method of claim 18, wherein the gooseneck mount includes a base plate and a cylindrical tube extending therethrough, further including coupling the base plate via weld studs and nuts to a mounting plate of the H-frame.

22. The method of claim 21, further including coupling support brackets between the base plate and an outer surface of the cylindrical tube.

\* \* \* \* \*